Oct. 7, 1958  R. LANKES  2,854,887
PROJECTION MICROSCOPES
Filed Feb. 4, 1957  2 Sheets-Sheet 1

INVENTOR
RICHARD LANKES,
by
John B. Brady
ATTORNEY

Oct. 7, 1958 R. LANKES 2,854,887
PROJECTION MICROSCOPES
Filed Feb. 4, 1957 2 Sheets-Sheet 2
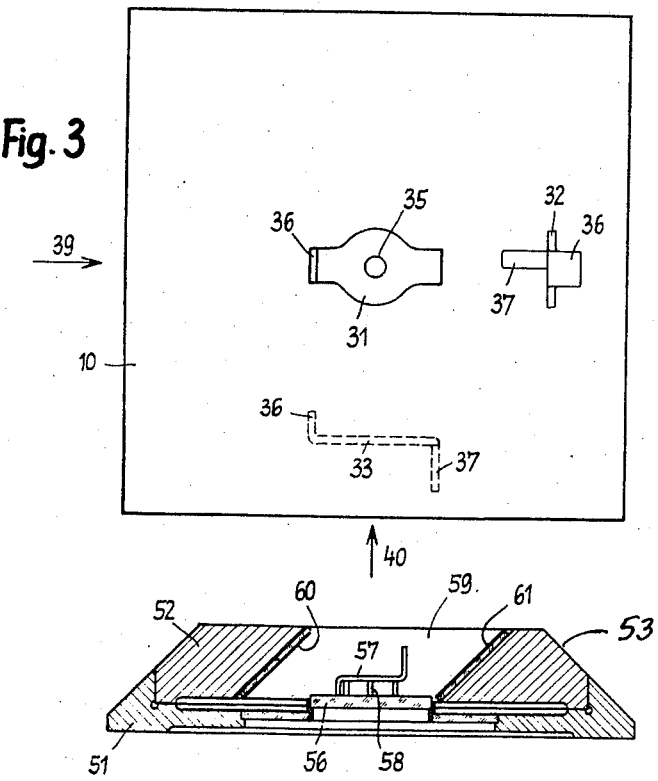
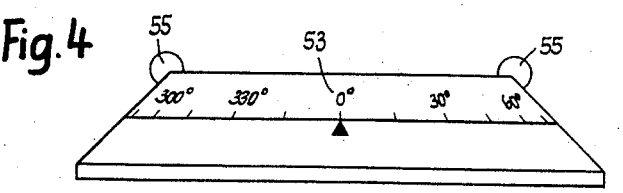
INVENTOR
RICHARD LANKES,
by John B. Brady
ATTORNEY

United States Patent Office 2,854,887
Patented Oct. 7, 1958

2,854,887

PROJECTION MICROSCOPES

Richard Lankes, Munich, Germany, assignor to Hans Deckel, Munich, Germany, and Friedrich Wilhelm Deckel, Zug, Switzerland Application February 4, 1957, Serial No. 638,058

Claims priority, application Germany February 3, 1956

2 Claims. (Cl. 88—24)

The present invention relates to a projection microscope for taking measurements, a type of instrument that has been used in precision engineering for some years. In a projection microscope of this kind the viewed object is exposed to the preferably telecentric beam of a projection system and its image is projected onto a ground glass screen. Magnification can be adjustably controlled so that the image of the object can be compared with a sketch thereof on the ground glass screen. Apparatus of this kind is well known.

Many of the workpieces inspected with the help of these instruments are of complicated shape and the required measurements are generally located in different planes. Moreover, the accuracy of the measurements naturally depends upon the position of the work in relation to the direction of the telecentric beam, and it is difficult to ensure and check the retention of its true position if the work has a complicated geometrical shape.

It is the object of the present invention to remedy these defects. The invention which relates to a projection microscope for taking measurements consists in that at the point where the object it is desired to observe is located a projecting beam is arranged to intersect a second projecting beam at a well defined and possibly controllably variable angle in such a way that the two beams will produce two images on the screen representing two projections of the object taken at well defined relative angles.

According to a further feature of the invention likewise relating to a projection microscope of known type, one of the projecting beams is arranged at the point where the viewed object is located to intersect the other projecting beam perpendicularly or approximately perpendicularly and then to be reflected into parallelism therewith behind the said object in such a manner that images of two relatively perpendicular projections of the object will appear on the screen. This arrangement may be so contrived that the deflection of the one of the projecting beams is effected by means of two reflecting surfaces arranged to be rotatable about an axis that is preferably parallel with the direction of the other, principal, projecting beam so that a side elevation of the object can be produced in any desired direction of view.

An illustrative embodiment of the invention will now be more particularly described with reference to the accompany drawings, in which:

Figure 3 shows the projected images, and

Figure 4 shows the structural details in a practical embodiment of a lay-out according to Figure 2.

Figure 1:
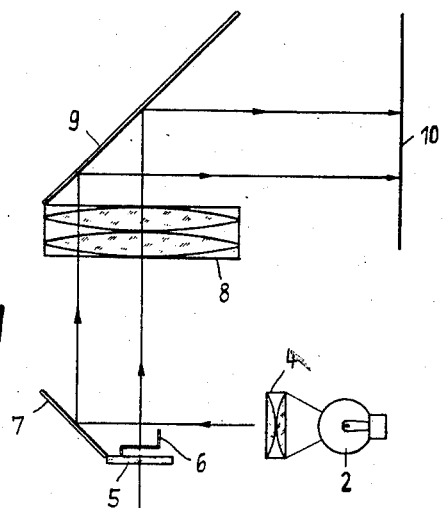
Figures 1 and 2 are diagrams illustrating the principle of operation of such a projection microscope.

In diagram form Figure 1 shows the principles of construction of a projection microscope. The light emanating from the sources 1 and 2 is converted by condenser systems 3 and 4 into telecentric beams. One beam passes from below through a glass plate 5 which serves as an object carrier, that is to say, upon which the viewed object 6 is placed. The second beam crosses horizontally above plate 5 so that it is at a predetermined angle in relation to the first beam. This second beam is upwardly reflected by a mirror 7. Above the object carrier are one or possibly two projection lenses 8 which focus images of the object on a screen 10 after reflection from a mirror 9. In this manner two views of the object 6 in two predetermined directions are projected onto the screen, the relative directions being determined by the relative angles of the two telecentric beams at the point where the object 6 is located. If desired, the angle between the two beams may be adjustably varied by the displacement of the source 2 together with the condenser system 4 and the mirror 7 or by the rotation of the assembly about an axis through the object 6. The angle of rotation may be ascertained by reference to a scale.

Figure 2:
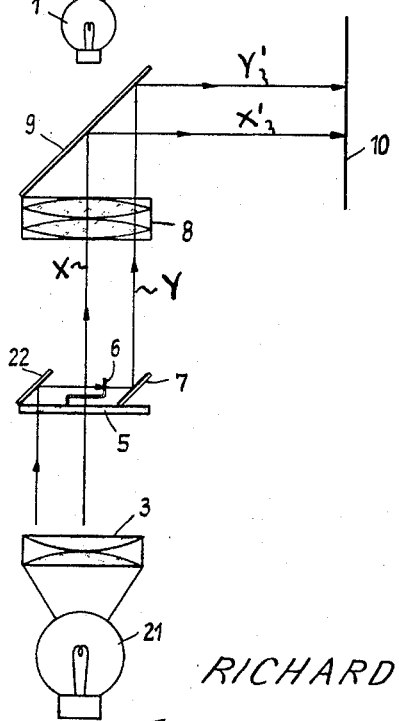

In an advantageous arrangement a single light source may be used, as shown in Figure 2. This single source 21 again emits a telecentric beam which passes through the object carrier 5 from below.

A mirror 22 is arranged in the path of the telecentric beam that emanates from the lamp 21. The rays incident from below at the mirror 22 are horizontalised by the mirror which is set at an angle of 45° to the incident beam, as shown in the drawing, and which therefore illuminates the object 6 in a line perpendicular to the direction of the principal projecting beam. The horizontal beam is then intercepted by a second mirror 7 likewise inclined at an angle of 45° which reflects it back into parallelism with the principal beam to be refracted together therewith by the lens 8 and reflected by mirror 9 so as to form an image on the projection screen 10. Consequently, there will appear on the screen, side by side with the plan view image of the object produced by the principal beam, a side view of the object in a direction related to that of the plan view according to the angular position of mirror 22.

Figure 3 shows images representing a plan projection 31 and a side elevation 32 and 33 respectively on the screen of, for instance, a cranked lever with an axially drilled hole 35, one lever arm 36 extending upwards and another lever arm 37 extending downwards. Next to the plan projection image 31 in which the cranked lever arms 36 and 37 appear fore-shortened, an image will appear on the screen 10 of a side view 32 showing the cranked lever arms 36 and 37 in their correct lengths and widths, the view being in the direction indicated by the arrow 39, which depends upon the positions of the two mirrors 7 and 22. If desired, these mirrors may be rotated to produce a side view in the direction of arrow 40. In this position the distance between the two levers can be measured. It is therefore possible in the manner described, without moving the object itself, to check dimensions in different planes. The side elevation may also be used to check the measurements in plan by ascertaining in the side elevation whether the object is properly orientated, i. e. horizontally and vertically correctly positioned with respect to the projecting beam, since an accurate determination of dimensions in plan depends upon the accuracy of orientation.

To permit the direction in which the side elevation is taken to be selected as may be desired, the two mirrors 7 and 22 are arranged to be rotatable as a unit. This assures that the relative position of the two mirrors will be accurately maintained as is required in view of the employment of a telecentric beam and the consequent possibility of producing good definition of the focused image.

Figure 4 shows a structural embodiment of an apparatus which permits the subject matter of the present invention to be incorporated in an existing known type of projection microscope without the need of modifying the same. The apparatus takes the form of an assembly which can be mounted on the conventional object carrier to produce images of a plan view and side elevation of the object on the projection screen in the manner that has been described. The assembly consists of a base plate 51 which carries a rotatable mount 52. The angle of rotation can be read by reference to a scale 53, on the outside periphery of the mount, which registers with an index mark, the two buttons 55 being provided to facilitate rotating the mount. Rigidly fitted into the circular opening in the base plate 51 is a preferably plano-parallel glass or plexiglass plate 56 upon which the object 57 it is desired to gauge is placed. To permit objects with long projections to be securely positioned a number of thin pins 58 are inserted into the plate 56, the pin ends being ground parallel with the surface of the plate 56. Since these pins extend exactly in the direction of the rays they will appear merely as dots in the projected image. On the inside of the circular opening 59 the rotatable mount carries two plane mirrors 60 and 61, the mirror 60 being tilted with its face downwards to intercept the incident beam that enters from below. The mirror 61 is fitted opposite the mirror 60 and reflects the horizontal beam in the vertical direction. The two mirrors 60 and 61 must be fitted in such a way that the reflected beam from the mirror 61 is exactly parallel with the incident beam on the mirror 60. Preferably the beam between the two mirrors 60 and 61 should be exactly horizontal so that the resultant projections are actually related perpendicular plan views and side elevations. However, it will be readily understood that in special cases this requirement may be varied. By turning the mount 52 in relation to the base plate 51 the direction of the beam between the two mirrors 60 and 61 can be rotated, as may be desired, in the horizontal plane, so that any required side elevation of the object 57 can thus be produced on the screen.

An assembly as shown in Figure 4 permits the principle underlying the present invention to be applied to the conventional type of projection equipment at present in use.

There is, of course, nothing to prevent the use of two separate sources of light as illustrated in Figure 1, one source supplying the beam for the projection of the plan view and the other that for the projection of the side elevation. If desired, the two beams of light might be produced by using the rays emanating from one and the same projection source (such as a helical incandescent wire) in two different directions.

In the equipment that has been described the optical paths between the object and the focusing lens of the two beams for creating the images of a plan view and side elevation are of different lengths. Without the provision of supplementary devices an image of the plan view and an image of the side elevation could not therefore be brought into accurate focus at the same time. However, the difference in the lengths of the optical paths may be easily corrected by introducing optical path extension elements (plano-parallel glass plates, co-operating inclined mirrors and the like) into one of the beams.

What I claim is:

1. A projection microscope comprising a light source, means for projecting a main beam therefrom, a screen, means for supporting an object, two reflecting surfaces located laterally with respect to the object, the said surfaces reflecting a part of the beam in such a way that at the point where the object is located this part of the beam will intersect the main undeflected part of the beam at least approximately perpendicularly and will be reflected back into parallelism with the original main beam beyond the viewed object in such a way that an image in plan and an image in side elevation of the object will appear on said screen and, wherein the two reflecting surfaces are adapted to be rotated as a unit about an axis parallel with the main beam.

2. A projection microscope according to claim 1, said two reflecting surfaces being rotatably mounted on a transparent object carrier.

References Cited in the file of this patent
UNITED STATES PATENTS

| | | |
|---|---|---|
| 2,358,296 | Baty | Sept. 19, 1944 |
| 2,398,139 | Freeman | Apr. 9, 1946 |
| 2,500,051 | Wolff | Mar. 7, 1950 |